(12) United States Patent
Chatterjee et al.

(10) Patent No.: US 9,003,031 B2
(45) Date of Patent: Apr. 7, 2015

(54) METHOD AND SYSTEM FOR NETWORK TRANSACTION MONITORING USING TRANSACTION FLOW SIGNATURES

(71) Applicant: Tata Consultancy Services Limited, Maharashtra (IN)

(72) Inventors: Swarup Chatterjee, West Bengal (IN); Surath Dey, West Bengal (IN); Pritha Mitra, West Bengal (IN); Tanmaya Tewari, West Bengal (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 245 days.

(21) Appl. No.: 13/761,739

(22) Filed: Feb. 7, 2013

(65) Prior Publication Data

US 2013/0326055 A1  Dec. 5, 2013

(30) Foreign Application Priority Data

May 29, 2012 (IN) .......................... 1599/MUM/2012

(51) Int. Cl.
*G06F 15/173* (2006.01)
*H04L 12/26* (2006.01)
(52) U.S. Cl.
CPC .............. *H04L 43/04* (2013.01); *H04L 43/028* (2013.01); *H04L 43/08* (2013.01); *H04L 43/50* (2013.01); *H04L 43/12* (2013.01)
(58) Field of Classification Search
USPC ......... 709/200, 201, 202, 203, 204, 223, 224, 709/225, 226
See application file for complete search history.

(56) References Cited

U.S. PATENT DOCUMENTS

| | | | | |
|---|---|---|---|---|
| 6,026,379 | A * | 2/2000 | Haller et al. | 705/34 |
| 6,324,525 | B1 * | 11/2001 | Kramer et al. | 705/40 |
| 6,363,363 | B1 * | 3/2002 | Haller et al. | 705/40 |
| 6,484,203 | B1 * | 11/2002 | Porras et al. | 709/224 |
| 6,529,932 | B1 * | 3/2003 | Dadiomov et al. | 718/101 |
| 6,732,167 | B1 * | 5/2004 | Swartz et al. | 709/223 |
| 6,856,970 | B1 * | 2/2005 | Campbell et al. | 705/35 |
| 6,950,868 | B1 * | 9/2005 | Faraldo, II | 709/224 |
| 7,490,319 | B2 * | 2/2009 | Blackwell et al. | 717/124 |
| 7,552,212 | B2 * | 6/2009 | Chagoly et al. | 709/224 |
| 7,752,297 | B2 * | 7/2010 | Nooner et al. | 709/223 |
| 7,822,837 | B1 * | 10/2010 | Urban et al. | 709/223 |
| 7,904,555 | B2 * | 3/2011 | Nooner et al. | 709/224 |
| 7,953,850 | B2 | 5/2011 | Mani et al. | |
| 8,005,736 | B2 | 8/2011 | Botzer | |

(Continued)

OTHER PUBLICATIONS

Infosys "Bottleneck Analysis of J2EE Applications Using Performance Management Tools", Nov. 11, 2010.

(Continued)

*Primary Examiner* — Sargon Nano
(74) *Attorney, Agent, or Firm* — Hayes Soloway PC

(57) ABSTRACT

A method and system for monitoring performance of network transactions is described herein. According to the present invention, in a testing environment, transaction flow signatures representing a hierarchical flow of sub-transactions constituting the said network transactions are generated and stored for monitoring and analysis of the network transactions. In a real-time environment, the sub-transactions are identified through the stored transaction flow signatures for a particular network transaction and the identified sub-transactions are then monitored by metrics analysis engine to determine the performance of the network.

13 Claims, 8 Drawing Sheets

(56) References Cited

U.S. PATENT DOCUMENTS

| | | | |
|---|---|---|---|
| 8,351,898 B2* | 1/2013 | Raleigh | 455/405 |
| 2004/0010733 A1* | 1/2004 | S. et al. | 714/27 |
| 2006/0106717 A1* | 5/2006 | Randle et al. | 705/45 |
| 2006/0212932 A1* | 9/2006 | Patrick et al. | 726/11 |
| 2006/0229931 A1* | 10/2006 | Fligler et al. | 705/10 |
| 2007/0016831 A1* | 1/2007 | Gehman et al. | 714/43 |
| 2009/0164270 A1 | 6/2009 | Seidman | |
| 2011/0029657 A1 | 2/2011 | Gueta et al. | |
| 2012/0089418 A1* | 4/2012 | Kamath et al. | 705/3 |

OTHER PUBLICATIONS

Oracle "Business Transaction Management", Jul. 21, 2011.

Clabbyanalytics "Following Transactions Through the Cloud: Better Put Optier in Your Budget", Sep. 2010.

Jean-Pierre Garbani "Competitive Analysis: Application Performance Management and Business Transaction Monitoring", Sep. 9, 2010.

IBM "Transaction Tracking in Large-Scale Datacenters1", Dec. 29, 2009.

* cited by examiner ns a field of monitoring network transactions in a communication network. More specifically, it relates to a method and system for monitoring network transactions in a communication network using transaction flow signatures.

METHOD AND SYSTEM FOR NETWORK TRANSACTION MONITORING USING TRANSACTION FLOW SIGNATURES

FIELD OF THE INVENTION

The present invention relates generally to a field of monitoring network transactions in a communication network. More specifically, it relates to a method and system for monitoring network transactions in a communication network using transaction flow signatures.

BACKGROUND OF THE INVENTION

As the growth of online communication by means of internet, intranet and extranets has increased, several applications are being hosted by companies on the Internet for enriching their businesses and achieving global recognition. However, these companies check and ensure whether their applications hosted on the internet are performing as expected in order to fulfill their goals and objectives in the business fraternity. Therefore, frequent performance monitoring of these applications executed on the internet is required. More particularly, the monitoring of several nodes executing these applications is required in order to ensure proper functioning at each node without failure.

Generally, the monitoring of entire network transaction includes ensuring that all the nodes executing the transactions are functional, detecting link failures, determining the network traffics at different nodes at different instances and adopting policies such as redirecting traffic to alternative nodes from the failure node etc. The output of such monitoring is that it enables troubleshooting of the network and the allied components to facilitate execution of applications without failure. Though, there are several attempts made in the past to enable monitoring of network transactions in the network, still monitoring of sub-transactions constituting the network transaction as a whole is not enabled in an effective manner. In the current practices, network transaction monitoring is implemented by marking a certain page or a response code as the termination point of a network transaction from the user point of view. Following this, the data metrics for the marked network transaction are provided for the business transaction as a whole. In another method, business transactions are tracked across different layers of the network system by inserting markers to the network packets. Further, in another method, synthetic transactions are used for monitoring the business transactions.

However, the existing methods and systems enabling the network transaction monitoring have following technical problems and/or limitations:

The existing methods lay emphasis on identification of successful network transaction and lack measuring layer-wise performance data of the network transaction.

The identification of the network transaction to be monitored is done by referring the correct response being received, or a particular page having been displayed.

In few of the existing methods, wherein transactions are monitored across different layers, markers are added to the transaction to help identify them, or synthetic (robotic) transaction are used to monitor the systems performance. This may lead to increase in system overhead of the network.

Thus, in view of the above lacunae in the art, there is a long-felt need for a method and a system that enables a mechanism to monitor or track a layer wise performance measurement of the business transaction in the network without any requirement of synthetic transactions or scripts to be executed while implementing the monitoring process in the network.

OBJECTS OF THE INVENTION

The primary object of a present invention is to enable a system and method for monitoring a plurality of sub-transactions constituting a single network transaction in a communication network.

Another object of the invention is to provide a system and method that enables classification of nodes in the network hosting said sub-transactions into a plurality of layers such that each layer includes nodes performing similar functionalities.

Yet another object of the invention is to enable a system and method for generating a plurality of transaction flow signatures depicting a hierarchical flow of network transactions comprising plurality of sub-transactions from one layer to the other of said classified layers.

Yet another object of the invention is to enable a system and method for capturing of network transaction data at each classified layers and storing said captured data in a repository for further analysis.

Yet another object of the invention is to enable a system and method for identifying at least one transaction flow signature resembling the real-time network transaction from the said plurality of transaction flow signatures by means of a state-sequence machine.

Still another object of the invention is to enable a method and system for analyzing the transaction data captured for sub-transactions in the identified transaction flow signature to monitor the performance of the single network transaction constituted by said sub-transactions.

SUMMARY OF THE INVENTION

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

In one embodiment, the present invention discloses a system and method for monitoring and analysis of performance of sub-transactions constituting a single network transaction is disclosed. According to the method of the present invention, initially different nodes in the network on which an application is hosted are identified and grouped into plurality of layers. In this embodiment, such grouping of the nodes into layers is implemented based on type of service provided by each of the nodes in the network. More specifically, the nodes which provide the same service or implement similar tasks are grouped together into one layer.

Thereafter, the method of the present invention enables capturing of the network transaction data from the different layers. The captured data is then collated and stored on a repository for analysis and monitoring. Based on this data captured, a transaction flow signature is generated for each of the possible network transaction to be monitored. The generated signatures can be refined and then stored in a repository for further analysis.

Further, in accordance to this embodiment, monitoring of the systems in real-time is implemented by analyzing monitored data by leveraging the signatures captured as input to the analysis engine. The analysis engine filters and divides the data based on the client IP address. In accordance with this embodiment, a state-sequence machine is utilized to ascertain the transaction data flow of the particular network transaction. Finally, based on ascertaining the transaction data flow, a network transaction report, depicting the details about monitor of listing the number of times each network transaction was evoked, the average response time of a network transaction and also the number of times a network transaction failed.

In this embodiment, the system of the present invention comprises a layer configuration module capable of identifying and labeling the application environment servers/nodes based on their functionality, i.e. web server, application server, and database server etc. The network is classified into N different layers based on the functions performed by the different nodes. The nodes performing similar function are clubbed together into one layer. Further, the system comprises a network transaction data capture module responsible for the capture of the network transaction data at each node and then collating said data from the different machines together into to a repository for storage and analysis.

In accordance with this embodiment, the system comprises a transaction signature generation module adapted for the capturing and refinement of the network transaction's hierarchy that constitute a particular network transaction. Further a network transaction monitoring engine is responsible for the analysis of captured network transaction data and its comparison with the transaction signature templates while utilizing a metrics analysis engine for analysis of the network transaction data.

BRIEF DESCRIPTION OF DRAWINGS

The foregoing summary, as well as the following detailed description of embodiments, is better understood when read in conjunction with the appended drawings. For the purpose of illustrating the invention, there is shown in the present document example constructions of the invention; however, the invention is not limited to the specific methods and apparatus disclosed in the document and the drawings.

DETAILED DESCRIPTION

Figure 1:
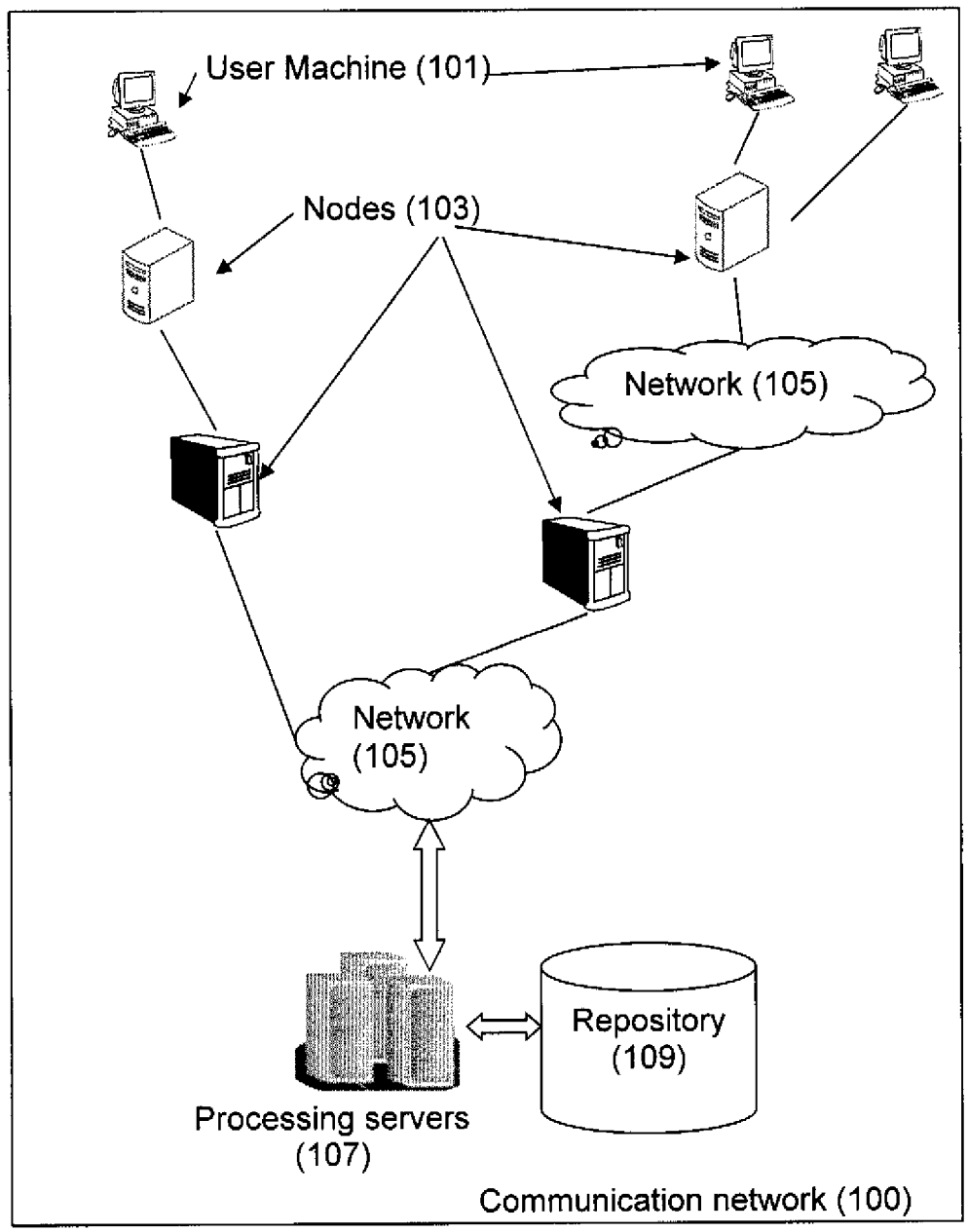
FIG. 1 is a system block diagram illustrating a communication network (100) comprising a first set of nodes according to an exemplary embodiment of the invention.

The description has been presented with reference to an exemplary embodiment of the invention. Persons skilled in the art and technology to which this invention pertains will appreciate that alterations and changes in the described method and system of operation can be practiced without meaningfully departing from the principle spirit and scope of this invention.

In accordance to one embodiment of the present invention, a system and method for monitoring performance of a communication network is disclosed. The said communication network comprises of a first set of nodes such as web-servers, applications servers, database servers and the like, wherein each node responsible for performing various tasks in the network. In accordance to one embodiment of the present invention, few of these first set of nodes, hereinafter referred as a second set of nodes are host various applications to be monitored in the network. The second set of nodes collectively executes network sub-transactions, wherein said sub-transactions together constitute at least one network transaction to be monitored.

According to one embodiment, said second set of nodes hosting applications are classified into a first set of layers. The classification of nodes is implemented in a manner such that each node of the second set of nodes is classified into at least one layer of said first set of layers based on the functionalities or tasks executed for facilitating the functions of applications hosted. More particularly, one or more nodes from the second set of nodes, hereinafter referred as a third set of nodes executing similar functionalities are classified into a single layer from the first set of layers. In a similar manner, the network can be classified into N different layers based on the functions performed by the different nodes. The nodes performing similar function are clubbed together into a single layer.

In one embodiment, the first set of layers and transaction data captured at each of the layers are monitored in testing environment to identify different possible transactions executed by the first set of layers in the communication network. In this embodiment, a plurality of sub-transactions is executed in the testing environment in order to capture all possible associated network transaction in the communication network. In this embodiment, a transaction flow signature is generated for each captured network transaction and sub-transactions. A single network transaction flow signature may comprise of a plurality of network transactions wherein each network transaction is constituted by a number of sub-transactions. The transaction flow signature, generally, is a template storing all the information of the associated network transaction such as metadata for each network transaction, parameters in the request content of the transaction, and the hierarchical flow of the at least one sub-transaction from one layer to the next. In this embodiment, a plurality of transaction flow signatures are generated for each possible network transaction and stored in a repository. The template contains all the information about the corresponding network transaction and represents it in a layer wise format.

In one embodiment, in a real-time environment, a transaction data for a particular network transaction is captured from second set of nodes for monitoring the communication network. The said network transaction includes plurality of sub-transactions. In this scenario, the real-time captured transaction data is analyzed to identify whether the monitored network in the testing environment is same as that of the captured network transaction in the real-time environment. The captured transaction data is sorted in a repository and classified on the basis of said first set of layers. More particularly, the transaction data captured at each node involved in the real-time network transaction is sorted based on layers wherein each layer contains nodes performing similar tasks.

More particularly, the nodes are classified into multiple layers such as web server layers, application server layers, database server layers and the like.

In one embodiment, the sorted data is then utilized for identifying transaction flow signature similar to the network transactions from the stored transaction flow signatures by correlating network parameters and transaction parameters associated with the sub-transaction executed between the second set of nodes. The network parameters comprises of source internet protocol address of the source node in the sub transaction, destination internet protocol (IP) address of the destination node of the sub transaction and communication port address of the corresponding nodes involved in the transaction. The transaction parameters comprises of transaction request count for each transaction, request content of the corresponding sub-transaction and the response time of each transaction. After the classification of nodes on the bases of IP addresses the classification is taken to the next step by identifying the plurality of port numbers associated with each node involved in the network sub-transaction. Similar correlations are identified for all layers from the second set of nodes involved in the network transaction until a transaction flow signature for the monitored network transaction is identified. In case if the same node is constituting two different layers based on the function that it performs (for instance a single node constituting the application server and database server) then the node will be treated as two separate elements and the data for the same is distinguished by use of IP address followed by the communication port to which the data was communicated, as the application server and database server will have separate communication port numbers. Further the network transactions taking place at this node will be classified into the corresponding layers based on the port address.

In one embodiment, the identified transaction flow signature is then utilized to monitor the sub-transactions in the network transaction. A metrics analysis engine is used to perform detailed analysis of the network transactions and sub transactions. For this purpose a performance metrics for each layer in the network is generated. Further this metrics comparisons is performed for multiple layers, multiple sessions and multiple individual layers. The metrics analysis engine further generates performance reports of the said communication network based on different parameters.

Referring to FIG. 1 is a system block diagram illustrating a communication network (100) according to an exemplary embodiment of the invention. In this embodiment, said communication network (100) consists of a plurality of nodes (103) such as application server, database server and web server, hereinafter referred as a first set of nodes. The said first set of nodes communicates with each other by means of transmitting and/or receiving request/response packets over individual network (105). Further, the communication network comprises a plurality processing servers (107) electronically coupled with a repository (109). In one embodiment, said repository (109) may be included in the processing servers. In another embodiment, the repository (109) is an independent machine coupled to the processing servers (107). As observed through FIG. 1, a user machine (101) is shown that initiate the process of transaction monitoring in accordance with an exemplary embodiment of the present invention. The transaction monitoring is implemented by the processing servers (107) with the help of several modules included in one or more of the processing servers (107).

Figure 2:
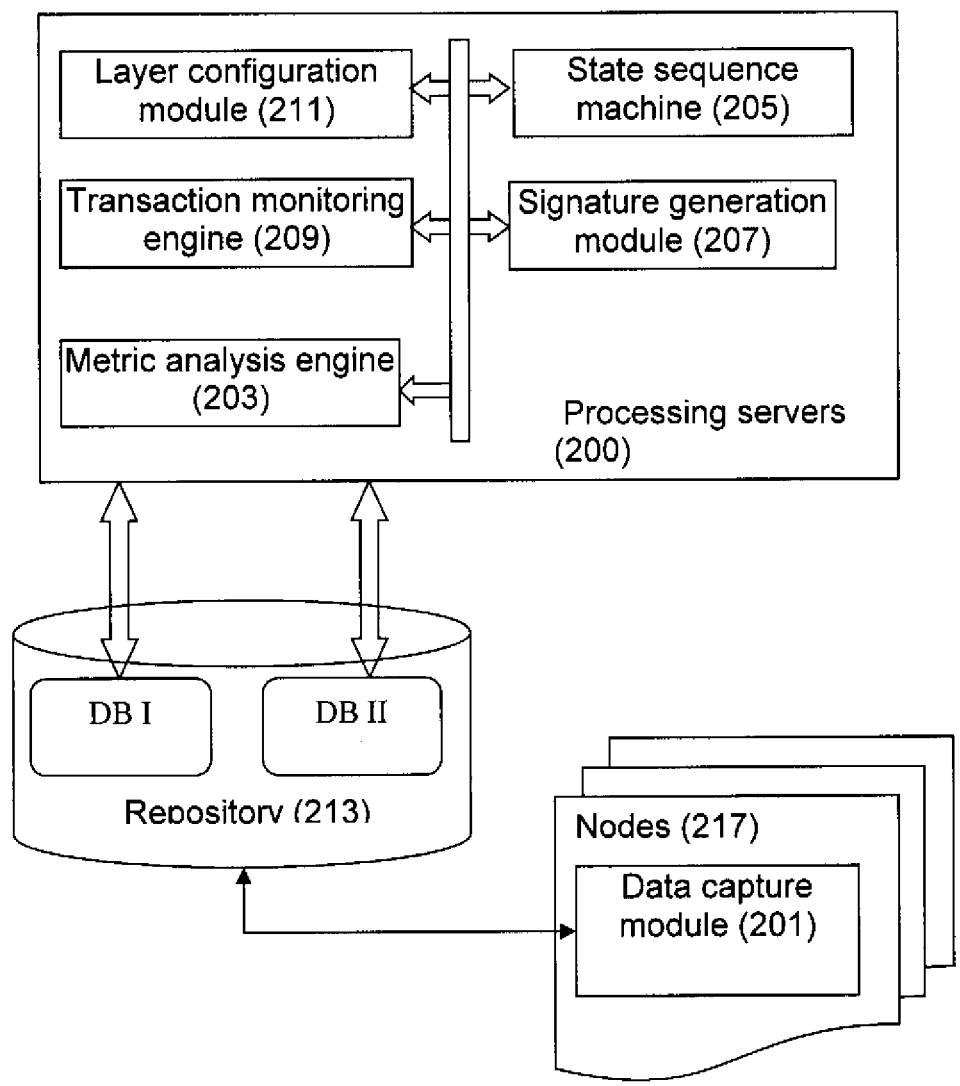
FIG. 2 is a system architecture diagram of a plurality of processing servers comprising modules implementing the process of network transaction monitoring according to an exemplary embodiment of the invention.

FIG. 2 is a system architecture diagram of the processing servers (200) as illustrated in FIG. 1 implementing the process of network transaction monitoring according to an exemplary embodiment of the invention. As illustrated in FIG. 2, the processing servers (200) comprises a layer configuration module (211), a signature generation module (207), a transaction monitoring engine (209), a metrics analysis engine (203), and a state-sequence machine (205) collectively implementing the transaction monitoring process. The arrangement of these modules is such that it enables reducing the overhead in the communication network. For example, in order to balance the workload on each of the processing servers (200), the modules implementing the transaction monitoring is distributed across several processing servers (200). More particularly, in this embodiment, each processing servers (200) will include one or more processing modules and hence enables division of task processing amongst individual servers. In another embodiment, the processing modules may be included in the single processing server.

Further, as illustrated in FIG. 2, a repository (213) electronically coupled to the processing servers (200) is shown. In another embodiment, the repository (213) can be included in one of the processing servers itself. The repository (213) is further divided into two database layers, database I (DB1) layer and database II (DB II) layer configured to store network transaction details. The system architecture further comprise of plurality of nodes (217) that needs to be monitored for tracking network transactions in the network. Each of these nodes (217) further comprises a data capture module (201). The repository (213) is used to store the transaction data captured from these nodes (217). In an embodiment, the nodes to be monitored are selected from the first set of nodes (103) as shown in FIG. 1.

In one embodiment, said data capture module (201) is enabled to capture network sub-transactions along with the transaction data constituting at least one network transaction in the network for executing several applications hosted by one or more nodes (217) from the first set of nodes, hereinafter referred to as a second set of nodes of the communication network (100). The said transaction data captured from each of the second set of nodes is collated together and stored in said repository (213) for further analysis.

In one embodiment, said layer configuration module (211) is configured for identifying and labeling the second set of nodes based on their functionality. The said second set of nodes includes nodes (217) from the first set of nodes hosting the applications and is selected from a group comprising of but not limited to a web server, an application server, a database server and combinations thereof. The second set of nodes is labeled by classifying the second set of nodes with similar functionality into at least one layer. Thus, the layer configuration module (211) is enabled to classify the second set of nodes hosting applications executing the network transactions into a first set of layers. Each layer of the first set of layers includes one or more nodes (217), hereinafter referred to as a third set of nodes from the second set of nodes executing similar functionalities or tasks in the communication network. The third set of nodes are nodes (217) hosting the said application and performing similar tasks.

Figure 4:
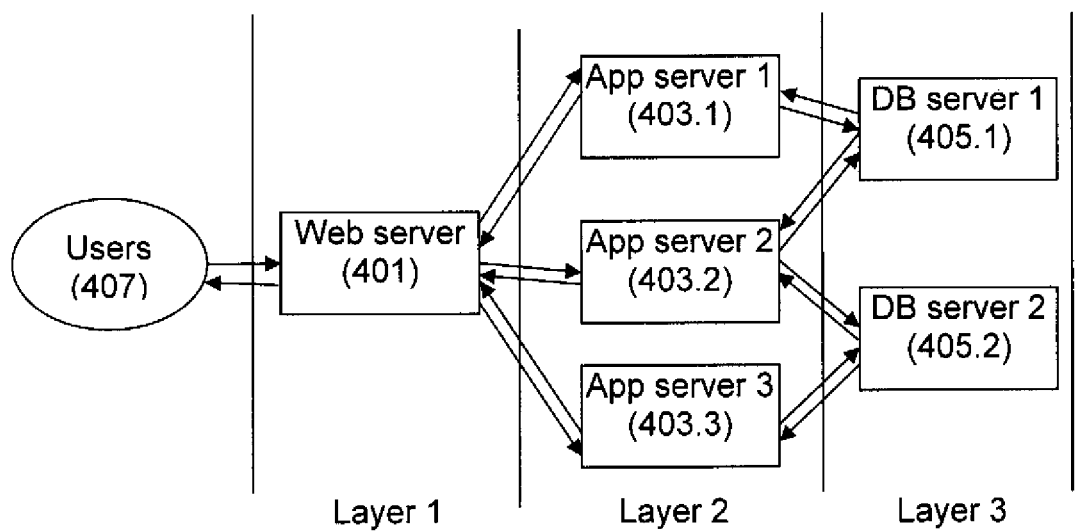
FIG. 4 illustrates an example of layer configuration according to an exemplary embodiment of the invention.

FIG. 4 illustrates an example of layer configuration according to an exemplary embodiment of the invention. In this exemplary embodiment, a logical grouping of the second set of nodes on which the web application is being hosted is implemented by the layer configuration module (211). As illustrated in FIG. 4, the said application is hosted in an environment with one web server (401), three application servers (403.1), (403.2), (403.3) and two database servers (405.1) and (405.2). In this embodiment, the layer configuration module (211) is enabled to generated three different layers: Layer 1, Layer 2 and Layer 3. The layer 1 comprises nodes from the second set of nodes performing tasks as that of a web server (401). The layer 2 comprises nodes from the second set of nodes performing tasks as that of an application server (403) and Layer 3 comprises nodes from the second set of nodes performing tasks as that of a database server (405). All the network sub-transactions and network transactions thereby taking place between the second set of nodes are recorded in the repository (213). More particularly, the transaction data at each of the said first set of layers is collated in the repository (213). This collected data is classified into the said first set of layers. The classification of network transactions is followed by executing a test run over the communication network. This is done to ensure and verify that the layers have been properly mapped and that all the nodes and servers are available and reachable in the network.

In an exemplary embodiment, referring to FIG. 2, a signature generation module (207) is then utilized for generation of a plurality of transaction flow signatures for the classified first set of layers in a testing environment. In the testing environment, transaction data captured at each layer of said first set of layers is analyzed to capture the sub-transactions and network transactions thereby executed between the second set of nodes. The identified network transactions are then stored in the form of transaction flow signatures in the repository (213). The transaction flow signatures further comprises a metadata and a node traversal path required for identification during further analysis and monitoring.

Figure 5:
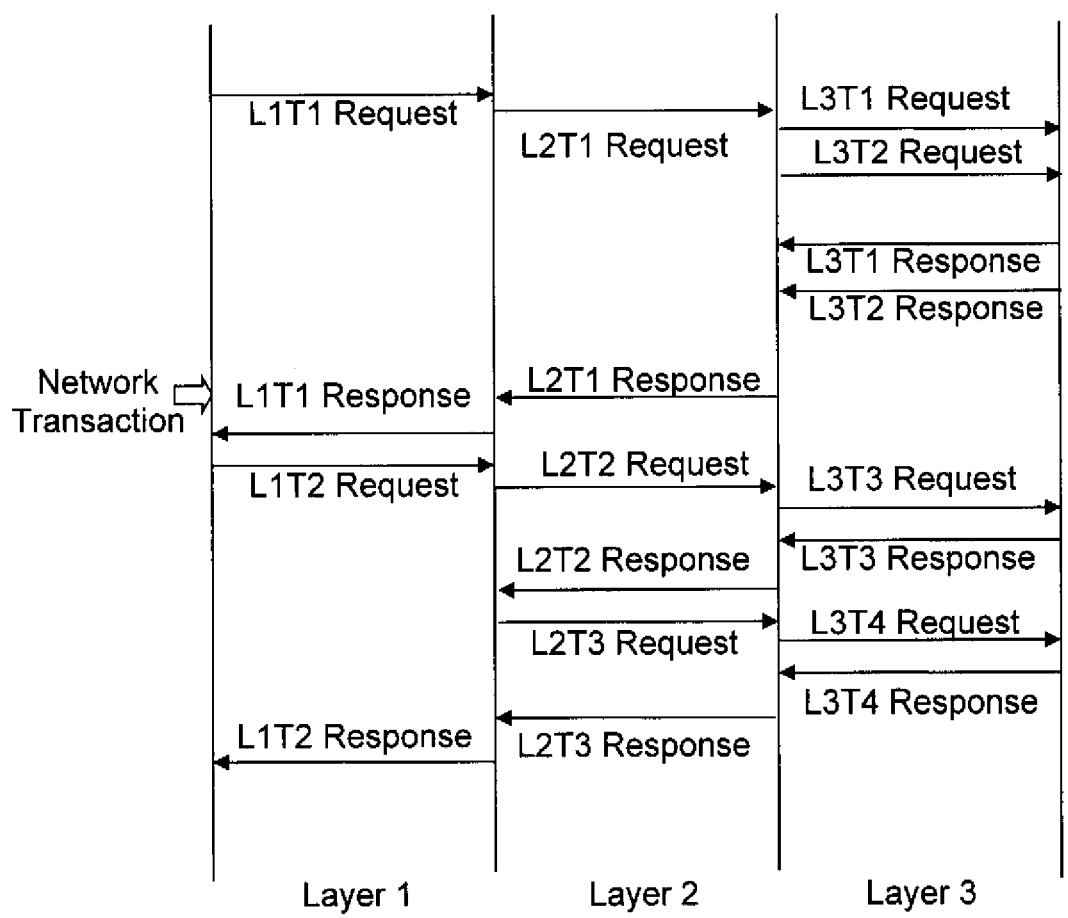
FIG. 5 illustrates an example of network transaction flow according to an exemplary embodiment of the invention.

FIG. 5 illustrates an example of network transaction flow and generating a transaction signature flow according to an exemplary embodiment of the invention. As illustrated, a transaction flow signature is generated, that comprises of a template of the different network transactions that constitute a single network transaction. The said template stores metadata for each transaction like parameters in the request content of the transaction and also the flow of the transaction from one layer to the next, all this information is captured for single user runs in the testing environment.

Referring to FIG. 5, in an exemplary embodiment, consider a network transaction that consists of two transactions between the user machine and the nodes of layer 1 marked L1T1 and L1T2, three transaction's between the nodes of layer one and layer 2 marked L2T1, L2T2 and L2T3 and the four transaction's between layer 2 and layer 3 are marked L3T1, L3T2, L3T3 and L3T4 . The transaction flow order is maintained according to the sequence of transactions which take place in the network. Since each layer may contain more than one node, each node is monitored for collecting the network transaction data for the purpose of transaction flow signature generation.

In an embodiment, the system enables generating request count for identical requests received from one layer to the other. More particularly, in case of a transaction having more than one sub-transaction with similar characteristics is checked by comparing the request content in the header of the packed received. The said request parameter is a parameter in addition to other parameters and identified variables grouped together in the packet header. If the request content checked is same as initial request, the request count parameter is incremented and updated in the transaction signature generated.

In an exemplary embodiment, referring to FIG. 2, a transaction monitoring engine (209) is configured to identify different network transactions in the communication network and record these transactions to measure layer-wise performance of the network transactions.

For example, consider a real-time network transaction data captured, corresponding to a single network transaction by the processing servers (200) and stored in the repository (213). The transaction monitoring engine (209) is then adopted to identify sub-transactions in the said single network transaction using time-based and IP-based correlation amongst the individual layers in the network.

In an exemplary embodiment, in the next stage, a transaction flow signature for the real-time captured data pertaining to the network transaction is identified from the stored transaction flow signatures. This is done using time based correlation between two sub-transactions and the said sub-transaction is further refined using source & destination IP address and port address of the said second set of nodes. Further, the parameters such as request content, request count and other identified variables in the header packet of each node are utilized to identify the transaction flow signatures.

Figure 6:
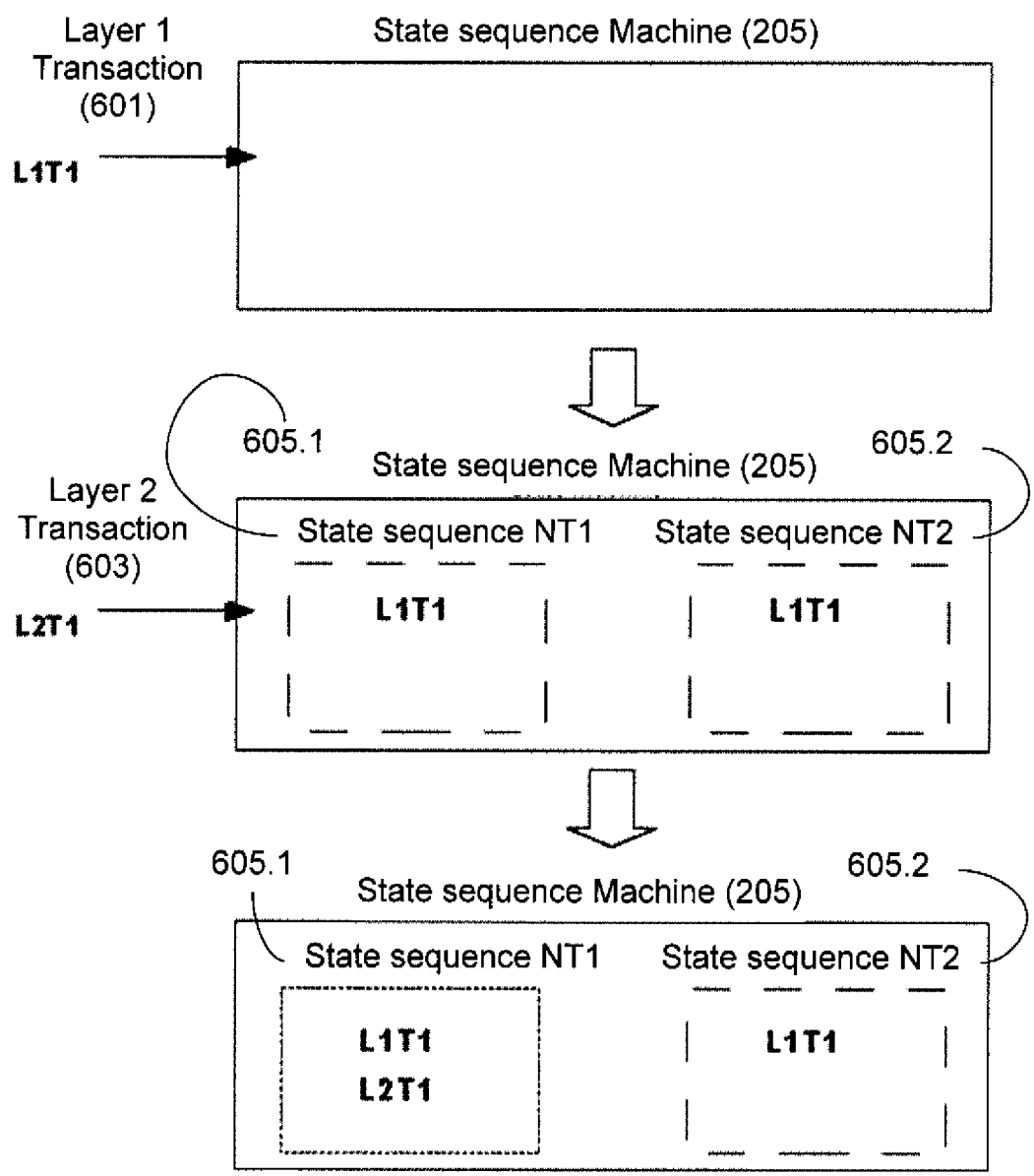
FIG. 6 illustrates a state-sequence machine configured for identification of network transactions according to an exemplary embodiment of the invention.

The processing servers (200) further comprises of a state sequence machine (205) configured for comparing captured real-time network transactions with the stored transaction flow signatures in order to identify the corresponding transaction flow signature associated with the said network transaction. FIG. 6 illustrates a state-sequence machine configured for identification and mapping of network transactions according to an exemplary embodiment of the invention.

Referring to FIG. 6, in an exemplary embodiment, identification of occurrence of a network transaction in the system is described. The transaction flow signatures captured earlier are used to generate template, this template is used as a roadmap by the state sequence machine (205) for identification of network transaction in the collated and sorted network data. Further referring to FIG. 6, a new state sequence is triggered in the state sequence machine (205) whenever a network transaction from the data matches a particular network transaction signature. A single network transaction may match more than one transaction flow signature, thus for all the different matching transaction signature a new state sequence is created in the state sequence machine (205). For each transaction from a layer which has found a match in a template, the transactions from the next layer are chosen based on a time selection logic such that, start time and end time of transactions of next layer must be between the start and end time of the selected transaction.

For example, in an exemplary embodiment, referring to FIG. 5, the transactions L2T1 is identified as having been triggered by L1T1 since its request and response is carried out between the request and response of L1T1. Similarly, transaction L3T1 and L3T2 are identified as having started and completed in the time it took to process transaction L2T1. The time based correlations and IP address are used to track a single network transaction from other transactions.

In accordance with the same embodiment of the present invention, if the sub transaction in the next layer matches any of the transaction flow signature templates, the state sequence of that transaction flow signature is carry forwarded to the next state. The logic used for matching of network transaction's with the transaction flow signature template makes use of the meta data in the signature to avoid comparison of variables and also to check for request count. If the number of network transactions of a particular type do not match the number in the signature the signatures state sequence becomes a candidate for being dropped. The checking for request count is only performed for data belonging to the same client IP address since they are eligible for comparison and count increment. It is assumed that all transactions are part of the same network transaction at each layer and each layer will have the same client IP address. This helps in selecting only those transaction's that are part of the same network transaction and not of another invocation of the network transaction.

In another embodiment of the present invention the state sequence is dropped only when all the network transaction from the current layer matching the time constraint have been used as input to the state machine. Incase if a state sequence does not moved ahead then the sequence is dropped. Further referring to FIG. 6, for all Layer-2 transaction's in a state sequence a time constraint factor for the Layer-3 transaction is determined such that, that Layer-3 transaction's start and end time is between the start and end time of the Layer-2 Transaction, and are grouped together based on matching client IP address. All such transaction groups are fed to the state machine and if any match is found with a transaction signature the corresponding state sequence is taken to the next state.

In an exemplary embodiment, once these transactions are identified, all the transactions which match with the same signature are clubbed together and fed to a metric analysis engine (203). The metric analysis engine (203) then subdivides the whole transaction into sub transactions and provides detailed analysis of the overall communication network. The repository (213) is a key component which stores all the analysis reports and generated transaction flow signatures. All these steps are repeated till the data from the last layer has also been fed to the state sequence machine. If any state sequence is able to transition to the final state the network transaction is said to have occurred and the transaction which led to the transitions are grouped together as one occurrence of the network Transaction.

These individual network transactions can now be used to calculate metrics like response time of the network transaction, percentage of time spent by a network transaction in a particular layer, network overhead time between the different layers in the processing of a network transaction. Once these metrics have been calculated for the complete data set and for all transaction flow signature templates by the state machine, the results are collated and further analytics is carried out to generate the final report of the network transaction monitoring. Thus at the end, the network transaction monitoring is performed by leveraging network transaction flow signatures, the final output of the system is in a consolidated report of the various network transactions that have been identified by the transaction flow Signature. The report may optionally include the actual network transaction's that were part of the individual network transaction's if it is so desired. The performance constraints measured includes from a group consisting of number of times the said network transaction is evoked, average response time of the said network transaction and number of times the said network transaction is failed.

Figure 3A:
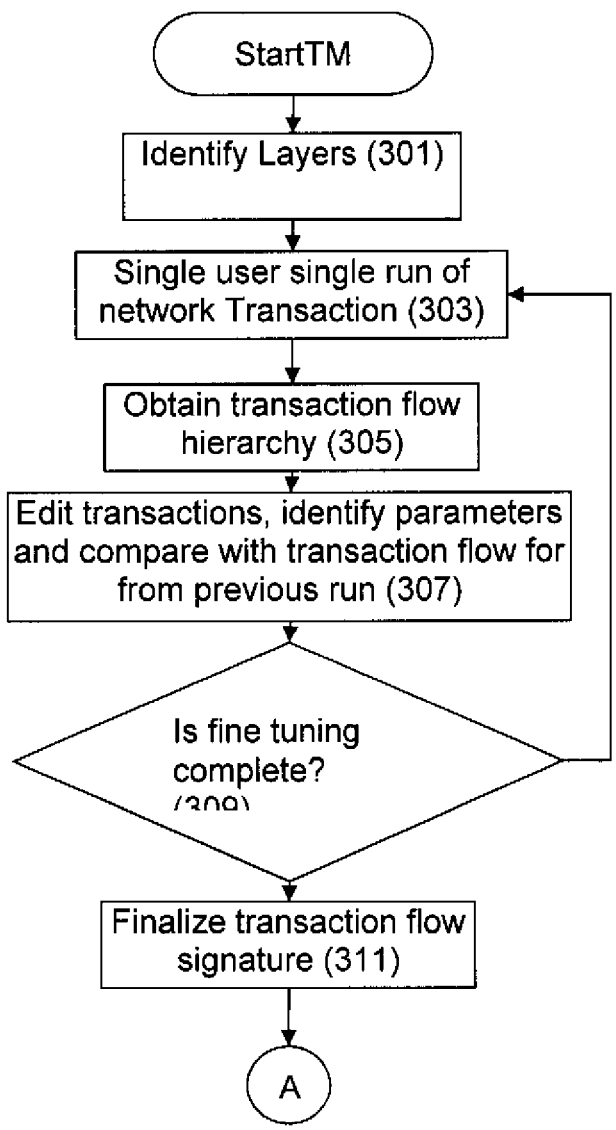
FIGS. 3(a), 3(b) and 3(c) are flowcharts illustrating steps implemented by the modules in process of network transaction monitoring according to an exemplary embodiment of the invention.
Figure 3B:
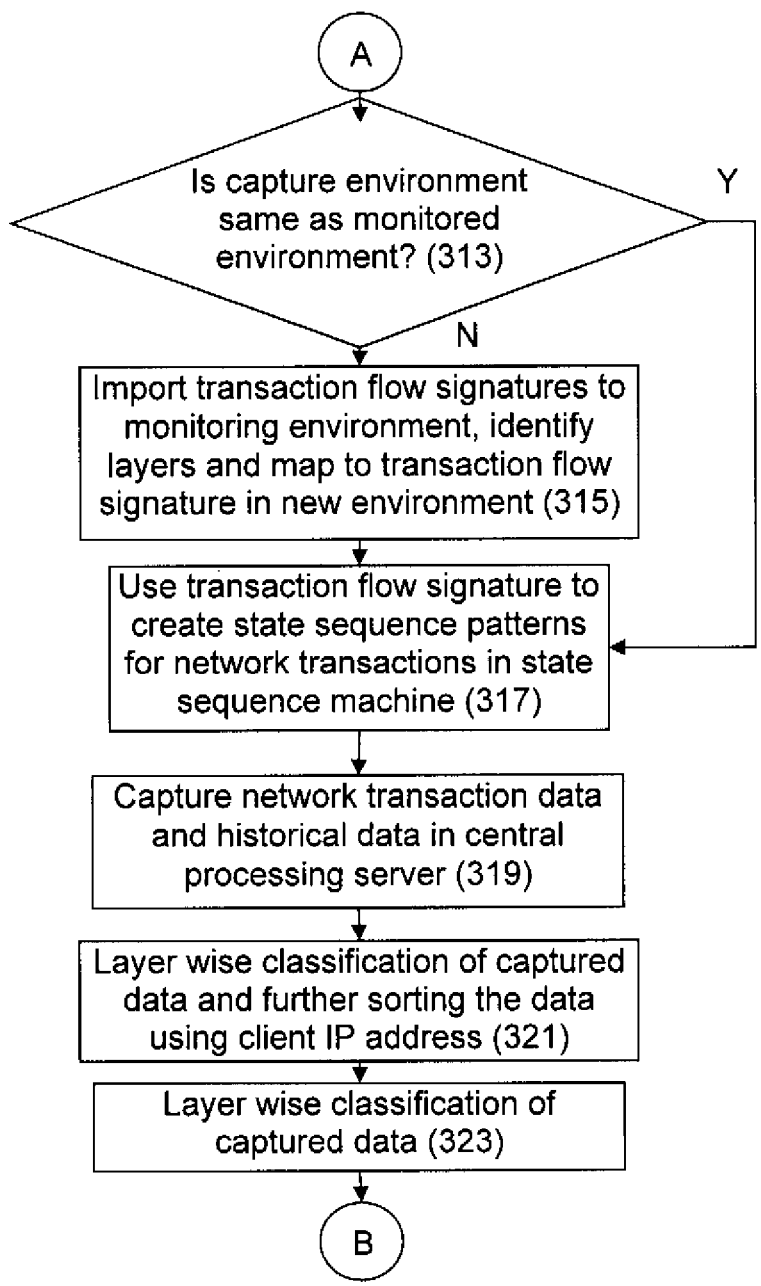
Figure 3C:
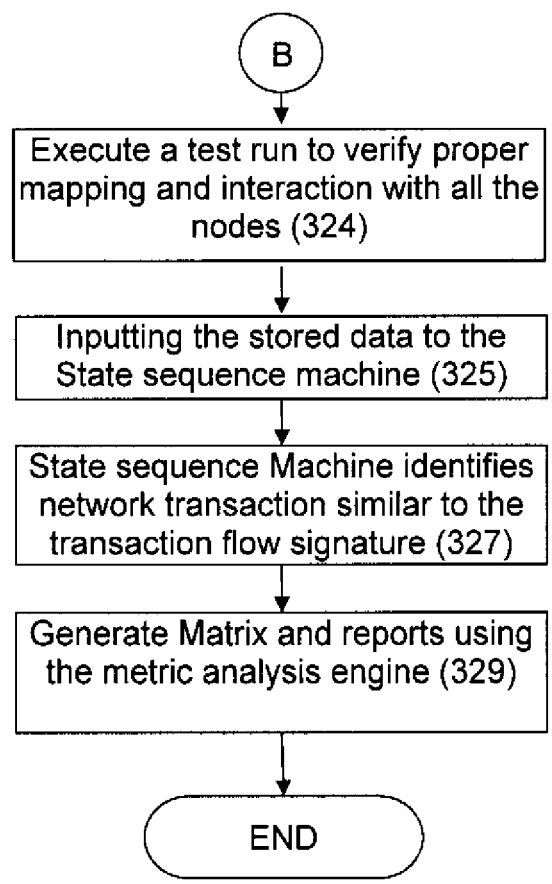

Referring to FIGS. 3(a), 3(b) and 3(c) are flowcharts illustrating steps implemented by the modules in process of network transaction monitoring according to an exemplary embodiment of the invention.

As illustrated in FIG. 3(a), at step (301), the identified second set of nodes is classified into different layers, each layer comprising nodes performing similar tasks. In steps (303), (305), (307) and (309) iterative transactions are performed in testing environment to identify different possible combinations of transactions, based on which a plurality of transaction flow signatures are created, wherein each signature representing one network transaction. In an exemplary embodiment, at step (309) fine tuning of all the identified transaction flow signatures is done iteratively executing the same transactions and different possible results are stored in the respective in the form of transaction flow signatures. At step (311), the finalized transaction flow signatures are stored in a repository.

As illustrated in FIG. 3(b), identifying whether the capture environment is same as monitored environment is done at step (313). If not, transaction flow signatures are imported to monitoring environment and layers are identified to map transaction flow signature in new environment as shown in step (315). Further in step (317), transaction flow signatures are used to create state sequence patterns for network transactions in state sequence machine. In this step, a hierarchical flow of network transactions is created in state sequence machine which is further mapped with the transaction flow signature. In step (319), the network transaction data and historical data in captured in the repository. The captured data is further refined in step (321) with the help of IP address and communication port and finally classified into layers in step (323). At step (324) a test run is executed on the communication network to verify properly mapped between the layers and that all the nodes and servers are reachable in the network.

Further, as illustrated in FIG. 3(c), the stored data is inputted to the to the State sequence machine in step (325). In step (327) the state sequence machine identifies network transaction similar to the transaction flow signature. In step (329) metrics reports are generated using the metric analysis engine. For this purpose a performance metrics for each layer in the network is generated. The metrics analysis engine is adapted to perform a detailed analysis of the network transactions and sub transactions by comparing analysis metrics of multiple layers. In addition of the performance metric comparison for multiple layers, the metrics analysis for multiple sessions and multiple individual layers are also compared for performance analysis. The metrics report for various parameters such as response time metrics, bits in metrics, bits out metrics and the like are generated for enabling detailed analysis of the network. These metrics are individually compared in order to generate a detailed report of the said analysis.

Working Example

In an exemplary embodiment, consider a hosted web login application on the interne, the hosting of this web application involves one web server (WS1), two application servers (As1, As2) and one database server (DB1). In this embodiment, these servers are classified into three layers (L1, L2 and L3) whereby each layer comprises of servers performing similar tasks. For example, in this embodiment, the first layer L1 comprises one web server WS1, the second layer L2 comprises of two application servers AS1 and AS2 and the layer L3 comprises of one database server DB1. With the increase in number of nodes and variation in the tasks performed by each node the number of layers may increase.

In this exemplary embodiment, a sample network transaction of login application is carried out under testing environment to create a login transaction flow signature. The possible flows of the login process are described as:
- Login successful due to correct authentication information
- Login failed due to incorrect authentication information
- Login failed due to no user response In this exemplary embodiment, multiple iterations of the same transactions are carried out for the same possible flows and all these details are stored in the transaction flow signature for the login process.

The network transaction for successful login involves following sub-transaction steps:
1. User fills username and password in the text box and clicks on the login button on the login screen.
2. The request for login authentication is made from WS1 to AS1 or from WS1 to AS2 this step will constitute involvement of two nodes one from L1 and other from L2, this information is recorded in the transaction flow signature.

3. The request is forwarded to DB1 by AS1 for authenticating the received information, if the details are correct the DB1 sends a response to the AS1 that the login details are correct. If not the database DB1 sends a negative response to the AS1, all these details are stored in a hierarchical structure in the transaction flow signature template.

In a similar manner the two different network transactions for login failure due to incorrect authentication information and Login failed due to no user response are classified into sub-transactions and are included in a single network transaction flow signature. Further, signature for all the possible network transactions are created and stored in the signature flow template. The said communication network is monitored in real-time and network transaction data is captured from WS1, AS1, AS2 and DB1. Transactions are compared to the stored transaction flow signature for login process using a state sequence machine and source and destination IP address of different servers involved in the execution of login module. These transactions are then fed to an analysis engine which generates a detailed analysis report of the network performance. The analysis report represents layer wise performance of the communication network.

Advantages of the Invention

The present invention has following advantages:
1. The present invention enables layer-wise performance breakup of the communication network using transaction flow signature.
2. The present invention enables correct estimation of network performance using the said transaction flow signature.
3. The present invention enables network monitoring without modifying the existing infrastructure of the said communication network.

The invention claimed is:

1. A method for analysis of a plurality of network transactions in a communication network consisting of a first set of nodes characterized by monitoring a plurality of sub-transactions constituting the network transactions, the method comprising processor implemented steps of:
   classifying a second set of nodes, hosting the sub-transactions, into a first set of layers, each layer containing a third set of nodes with similar functionalities;
   capturing network transaction data at each node of each classified first set of layers and storing the network transaction data in a repository in the network in test environment;
   generating and storing a plurality of transaction flow signatures depicting hierarchical flow of the network sub-transactions amongst the classified layers and associated performance at each node based on the captured network transaction data in the test environment;
   capturing a network transaction data of at least one network transaction in the network in a real time environment from the first set of layers facilitating at-least one sub-transaction of the network transaction;
   identifying at least one transaction flow signature from the stored transaction flow signatures matching the network transaction by correlating network parameters and transaction parameters; and
   generating a diagnostic report indicating a layer-wise nodal anomalies and associated performance constraints in the communication network for the network transaction analyzed through identified transaction flow signature using metrics comparisons for multiple layers, multiple sessions and multiple individual layers.

2. The method of claim 1, wherein the second set of nodes is a sub-set of the first set of nodes.

3. The method of claim 1, wherein the third set of nodes is a sub-set of the second set of nodes.

4. The method of claim 1, wherein the transaction flow signatures generated further comprises a metadata and a node traversal path required for identification of at least one network transaction during analysis and monitoring.

5. The method of claim 1, wherein the wherein the network parameters includes source & destination internet protocol (IP) address and communication port address of the corresponding nodes involved in the transaction.

6. The method of claim 1, wherein the transaction parameters includes transaction request count, request content of the corresponding sub-transaction.

7. The method of claim 1, wherein the performance constraints includes from a group consisting of number of times the network transaction is evoked, average response time of the network transaction and number of times the network transaction is failed.

8. The method of claim 1, wherein the metrics comprises of response time metrics, bits in metrics, bits out metrics for second set of nodes.

9. A system for analysis of a plurality of network transactions in a communication network consisting of a first set of nodes characterized by monitoring a plurality of sub-transactions constituting the network transactions, the system comprising:
   a first set of nodes in form of communication nodes, each communication node comprising a data capturing module; and
   a processing server communicatively coupled to the first set of nodes via a communication network, wherein the processing server further comprises:
      a processor; and
      a memory coupled to the processor, wherein the processor executes a plurality of modules stored in the memory in order to:
         classify a second set of nodes, hosting the sub-transactions, into a first set of layers, each layer containing a third set of nodes with similar functionalities;
      capture module to capture network transaction data at each node of each classified first set of layers and storing the network transaction data in a repository in test environment, wherein the repository is electronically coupled to the processing server;
         generate and store a plurality of transaction flow signatures depicting hierarchical flow of the network sub-transactions amongst the classified layers and associated performance at each node based on the captured network transaction data in the test environment;
         capture a network transaction data of at least one network transaction in the network in a real time environment from the first set of layers facilitating at-least one sub-transaction of the network transaction;
         identify at least one transaction flow signature from the stored transaction flow signatures matching the network transaction by correlating network parameters and transaction parameters; and
         generate a diagnostic report indicating a layer-wise nodal anomalies and associated performance constraints in the communication network for the network transaction analyzed through identified transaction flow signature using metrics comparisons for multiple layers, multiple sessions and multiple individual layers.

10. The system of claim 9, wherein the second set of nodes is a sub-set of the first set of nodes.

11. The system of claim 9, wherein the transaction flow signatures generated further comprises a metadata and a node traversal path required for identification of at least one network transaction during analysis and monitoring.

12. The system of claim 9, wherein the repository is adapted to store the generated transaction flow signatures and the network transactions.

13. The system of claim 9, wherein the processor executes a module implementing a state sequence machine configured to identify the transaction flow signature by performing a time-based and Internet Protocol (IP) based correlation amongst the second set of nodes.

* * * * *

UNITED STATES PATENT AND TRADEMARK OFFICE
CERTIFICATE OF CORRECTION

PATENT NO.           : 9,003,031 B2                                      Page 1 of 1
APPLICATION NO.      : 13/761739
DATED                : April 7, 2015
INVENTOR(S)          : Chatterjee et al.

It is certified that error appears in the above-identified patent and that said Letters Patent is hereby corrected as shown below:

In the claims,

Col. 12, Claim 9, Line 43, before "capture network", delete "capture module to".

Signed and Sealed this
Ninth Day of February, 2016

Michelle K. Lee
*Director of the United States Patent and Trademark Office*